US009392226B2

United States Patent
Tian et al.

(10) Patent No.: US 9,392,226 B2
(45) Date of Patent: *Jul. 12, 2016

(54) GENERATING AND RENDERING SYNTHESIZED VIEWS WITH MULTIPLE VIDEO STREAMS IN TELEPRESENCE VIDEO CONFERENCE SESSIONS

(71) Applicant: Cisco Technology, Inc., San Jose, CA (US)

(72) Inventors: Dihong Tian, San Jose, CA (US); J. William Mauchly, Berwyn, PA (US); Joseph T. Friel, Ardmore, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/524,305

(22) Filed: Oct. 27, 2014

(65) Prior Publication Data
US 2015/0042748 A1 Feb. 12, 2015

Related U.S. Application Data

(63) Continuation of application No. 13/602,664, filed on Sep. 4, 2012, now Pat. No. 8,890,923.

(51) Int. Cl.
*H04N 7/14* (2006.01)
*H04N 7/15* (2006.01)

(52) U.S. Cl.
CPC . *H04N 7/152* (2013.01); *H04N 7/15* (2013.01)

(58) Field of Classification Search
CPC ....................................................... H04N 7/14
USPC ........... 348/14.01, 14.07, 14.03, 14.08, 14.09
See application file for complete search history.

(56) References Cited

U.S. PATENT DOCUMENTS

| 5,915,091 A | 6/1999 | Ludwig et al. |
| 8,144,181 B2 | 3/2012 | Gladstone |

(Continued)

FOREIGN PATENT DOCUMENTS

| EP | 0898424 A2 | 2/1999 |
| FR | 2873884 A1 | 2/2006 |

OTHER PUBLICATIONS

Rong Zhang et al., "Distinguishing Photorealistic Computer Graphics from Natural Images by Imaging Features and Visual Features," Electronics, Communications and Control (ICECC), 2011 International Conference on , vol., No., pp. 226-229, Sep. 9-11, 2011.

(Continued)

*Primary Examiner* — Olisa Anwah
(74) *Attorney, Agent, or Firm* — Edell, Shapiro & Finnan, LLC

(57) ABSTRACT

Techniques are provided for establishing a videoconference session between participants at different endpoints, where each endpoint includes at least one computing device and one or more displays. A plurality of video streams is received at an endpoint, and each video stream is classified as at least one of a people view and a data view. The classified views are analyzed to determine one or more regions of interest for each of the classified views, where at least one region of interest has a size smaller than a size of the classified view. Synthesized views of at least some of the video streams are generated, wherein the synthesized views include at least one view including a region of interest, and views including the synthesized views are rendered at one or more displays of an endpoint device.

22 Claims, 9 Drawing Sheets

(56) References Cited

U.S. PATENT DOCUMENTS

| | | |
|---|---|---|
| 8,164,617 B2 | 4/2012 | Mauchly |
| 2006/0215753 A1 | 9/2006 | Lee et al. |
| 2008/0291265 A1 | 11/2008 | Wagner et al. |
| 2009/0322915 A1 | 12/2009 | Cutler |
| 2010/0026781 A1 | 2/2010 | Ali et al. |
| 2010/0157017 A1 | 6/2010 | Pepperell |
| 2011/0096140 A1 | 4/2011 | Samadani et al. |
| 2011/0261142 A1* | 10/2011 | Shanmukhadas ........ H04N 7/15 348/14.1 |
| 2011/0279634 A1 | 11/2011 | Periyannan et al. |
| 2012/0026277 A1 | 2/2012 | Malzbender et al. |
| 2012/0147123 A1 | 6/2012 | Lian et al. |
| 2012/0200658 A1* | 8/2012 | Duckworth ............ H04N 7/152 348/14.07 |
| 2012/0249877 A1* | 10/2012 | Hernandez Costa ............ H04N 21/440272 348/564 |
| 2012/0320144 A1* | 12/2012 | Samadani .................. 348/14.08 |
| 2013/0342640 A1 | 12/2013 | Li et al. |
| 2014/0002585 A1 | 1/2014 | Leviav et al. |
| 2014/0028781 A1* | 1/2014 | MacDonald ........... G06Q 10/10 348/14.07 |

OTHER PUBLICATIONS

Tian-Tsong Ng et al., "Physics-Motivated Features for Distinguishing Photographic Images and Computer Graphics", ACM Multimedia, Nov. 2005(3).

Tian-Tsong Ng et al., "Classifying Photographic and Photorealistic Computer Graphic Images using Natural Image Statistics", ADVENT Technical Report #220-2006-6 Columbia University, Oct. 2004.

International Search Report and Written Opinion in International Application No. PCT/US2013/057492, mailed Jul. 16, 2014, 10 Pages.

* cited by examiner

GENERATING AND RENDERING SYNTHESIZED VIEWS WITH MULTIPLE VIDEO STREAMS IN TELEPRESENCE VIDEO CONFERENCE SESSIONS

CROSS-REFERENCE TO RELATED APPLICATIONS

This application is a continuation of U.S. patent application Ser. No. 13/602,664, filed Sep. 9, 2012, the entirety of which is incorporated herein by reference.

TECHNICAL FIELD

The present disclosure relates to telepresence environments and the combining of video streams from different endpoints into viewable content for participants within a meeting.

BACKGROUND

Room-based telepresence (TP) environments include systems that are equipped with multiple cameras and displays, where the TP systems are configured to send and receive multiple high-definition (HD) video streams. The video streams can be defined or classified as people streams, captured by cameras and containing views of meeting participants, and data streams, which are usually computer generated graphical content presented by meeting participants. There are a number of limitations in current TP systems with regard to receiving and showing multiple video streams. Some of the limitations of current TP systems include the following.

Known TP systems typically assume that a receiver of video streams, such as a TP server, has knowledge of whether an incoming video stream is a people stream or a data stream. In current TP systems, classification of video streams into people streams or data streams is predefined and signaled to a receiver (i.e., the receiver conducts no analysis on received video streams apart from the classification that has predefined and provided to the receiver). In addition, even though a TP server may perform composition on multiple video streams and send the composed video streams to one or more receiving endpoints, the composition is limited solely to scaling video images and arranging the scaled images according to a pane layout. The server neither analyzes nor uses any content information of the video images in performing the composition, nor does it leave the flexibility to a receiving endpoint. Further, at a receiving endpoint, the reception of video streams is limited to one HD stream per display, and each received stream is displayed at full size on one screen. When considering a single-screen endpoint, one people stream plus one data stream can be received and displayed on the same screen with a simple composition (e.g., a picture-in-picture or PIP display).

DESCRIPTION OF EXAMPLE EMBODIMENTS

Overview

Figure 1:
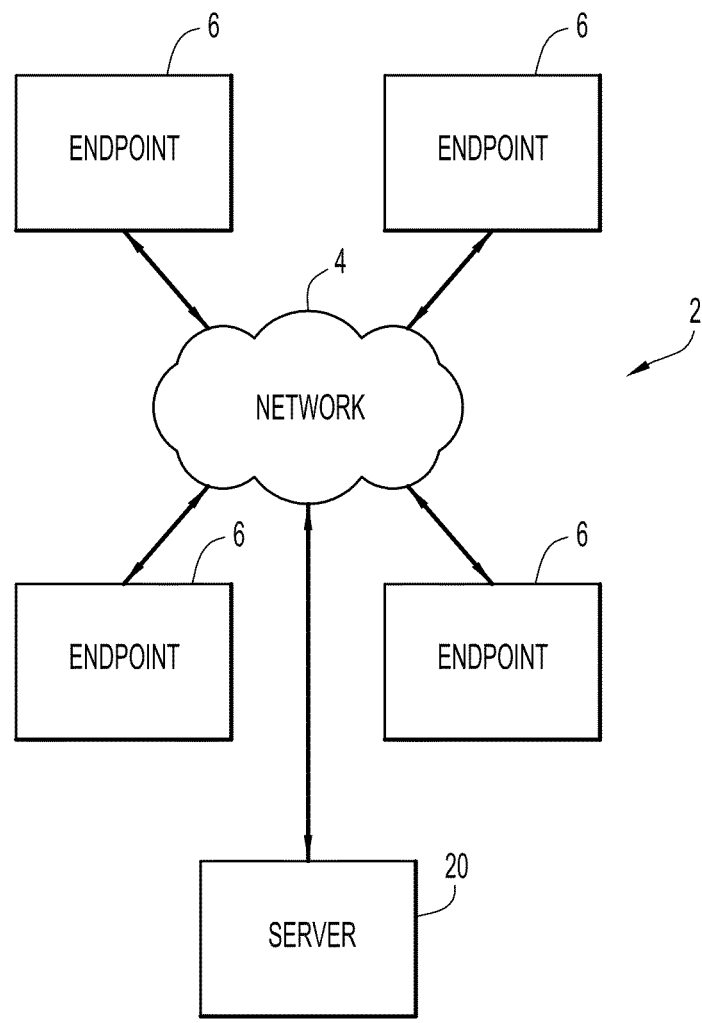
FIG. 1 is a schematic block diagram of an example system in which computing devices are connected to facilitate operation within a telepresence (TP) environment in which computing devices communicate with each other and exchange video streams in a TP meeting.

Systems and techniques are described herein for establishing a videoconference session between participants at different endpoints, where each endpoint comprises at least one computing device and one or more displays. A plurality of video streams is received at an endpoint, where each video stream comprises video content. Each video stream is classified as a classified view comprising at least one of a people view and a data view, where the people view includes an image of at least one participant that has been captured by a camera at one of the endpoints, and the data view includes content provided by a computing device at one of the endpoints. Each classified view is analyzed to determine one or more regions of interest. Image processing can optionally be applied to a region of interest to improve perceptual quality of the classified view. Synthesized views of at least some of the video streams are generated, where the synthesized views comprise combining a region of interest of at least one classified view with a region of interest of at least another classified view, and views including synthesized views are rendered for display at one or more displays of an endpoint device.

The systems and techniques described herein selectively map multiple video streams containing people and data views onto a set of displays in a video conference session so as to accommodate as many video streams as possible within a limited display real estate at each endpoint. In addition, semantics are derived from the video streams and presented in a manner that is most informative in a conferencing context and is also optimal for visualization. This results in a superior communication and collaboration experience for each participant within the video conference session.

Example Embodiments

Telepresence (TP) environments in video conferencing are configured to provide one or more users or conference participants at one endpoint with a feeling or experience of being immersed in the presence of other participants at other endpoints within the TP video conference, when in fact the participants are located at remote endpoints. In particular, immersive TP environments attempt to provide the feeling to a participant of being within the same room or environment as other participants by controlling features of the video streams, including lighting, views and acoustics of persons speaking within a video stream, and the design of furniture or other items within the room of different participants (so as to provide a more immersive experience to a user within the TP environment).

Telepresence environments utilizing systems as described herein provide synthesized views for participants at endpoints that are adapted based upon the content associated with multiple video streams that are being provided for a TP conference session at any given time. In particular, a TP conference session comprises a plurality of computing devices at different endpoints spatially separated from each other and in communication with each other via the conference session (e.g., using a host server that facilitates features of the TP conference session), where a plurality of video streams are provided by computing devices at different endpoints and a synthesized view is generated that combines elements or features of two or more video streams for display by the computing devices at the different endpoints. In particular, the systems and techniques described herein selectively maps multiple video streams containing people and data views onto a set of displays in a TP video conference session so as to accommodate as many video streams as possible within a limited display real estate at each endpoint. In addition, semantics are derived from the video streams and presented in a manner that is most informative under the conferencing context and optimal for visualization. This results in a superior communication and collaboration experience for each participant within the video conference session.

In accordance with techniques described herein, multiple video streams are provided as input from different endpoints participating within a video conference session, the view within each video stream is classified, each classified view is processed (including analysis and/or filtering of the views), and some or all of each view from a video stream is combined with other views from other video streams to form a synthesized view which is then rendered on some or all of the displays of endpoints participating within the conference session.

The synthesizing and rendering of views from multiple video streams input within the video conference session can be performed by a host server within the TP environment or, alternatively, at a TP endpoint. A block diagram is depicted in FIG. 1 showing an example system that supports operation of one or more video conferencing sessions in which synthesized and rendered views of multiple video streams input by different endpoints can be generated to provide an immersive and content-adaptive TP environment for participants of each video conference session. In particular, the system 2 comprises a network 4 that facilitates communications and exchange of video streams (including audio content, video content and/or other content that can be identified as person views or data views as described herein) as well as other information between endpoints 6 that may be spatially distant from each other. At least one host server 20 can also be provided within the network 4 to facilitate or support some or all of certain operations required for endpoints to engage in TP conference sessions and/or other types of communications as described herein. Examples of types of networks that can be utilized within system 2 include, without limitation, any one or more of local or wide area networks, Internet Protocol (IP) networks such as intranet or internet networks, telephone networks (e.g., public switched telephone networks), wireless or mobile phone or cellular networks, and any suitable combinations thereof. While four endpoints 6 and one server 20 are shown in the network 4 of FIG. 1, it is noted that the network can include any suitable number of endpoints and servers (e.g., two or more host servers).

Figure 2:
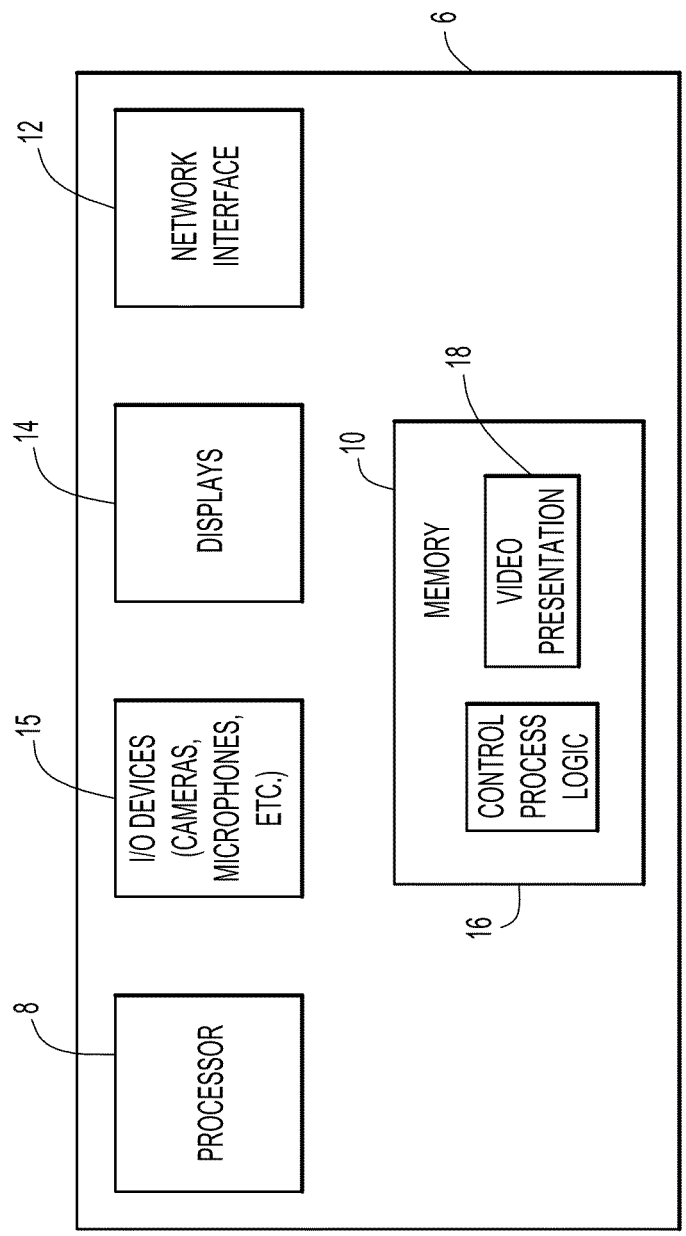
FIG. 2 is a schematic block diagram of an example system endpoint that facilitates capture and display of multiple video streams during a TP video conference session within the system of FIG. 1.

Referring to FIG. 2, each endpoint 6 comprises a system comprising one or more computing devices including at least one processor 8, at least one memory 10, at least one network interface 12, and a display arrangement 14 that includes at least one and preferably a plurality of display monitors or other types of display devices (e.g., one or more LCDs or other suitable display devices). Each endpoint 6 can further include any other suitable input or output devices (generally designated as I/O devices 15) including, without limitation, one or more cameras to record video content for video streams, one or more microphones to record audio content for video streams, touch screens, track pads, remote control devices, headphones, speakers and/or any other types of peripheral devices that can be connected with the endpoint computing device to facilitate user input as well as output of information associated with the computing device (e.g., keyboards, mouse devices, etc.). The display arrangement 14, microphone(s), camera(s) and other I/O devices 15 can be provided and suitably arranged within a room where TP conference sessions are engaged at a particular endpoint location.

The memory 10 of each endpoint 6 can be implemented by any conventional or other one or more memory or storage devices, and may include any suitable storage capacity. For example, the memory 10 may comprise read only memory (ROM), random access memory (RAM), erasable programmable read-only memory (EPROM), magnetic disk storage media devices, optical storage media devices, flash memory devices, electrical, optical, or other physical/tangible memory storage devices. Memory 10 comprises one or more computer readable storage media (e.g., a memory device) encoded with software comprising computer executable instructions as described herein such that, when the software is executed (by processor 8), it is operable to provide video and/or other data streams to one or more server devices 20 to facilitate performance of the operations described herein in connection with FIG. 4.

The processor(s) 8 of each endpoint 6 can comprise one or more microprocessors that execute control process logic instructions (generally depicted as instructions 16 stored within memory 10), including operational instructions and software applications stored within such memory. In particular, the memory 10 for each endpoint 6 includes a video presentation module 18 that includes one or more software applications that facilitate interaction with one or more endpoints 6 and/or one or more servers 20 to facilitate TP video conference sessions with other endpoints 6 over the network 4 as well as exchange of multiple video streams and/or other data streams that are associated with a TP video conferencing session or other forms of communication that may be supported by network server(s) 20.

Figure 3:
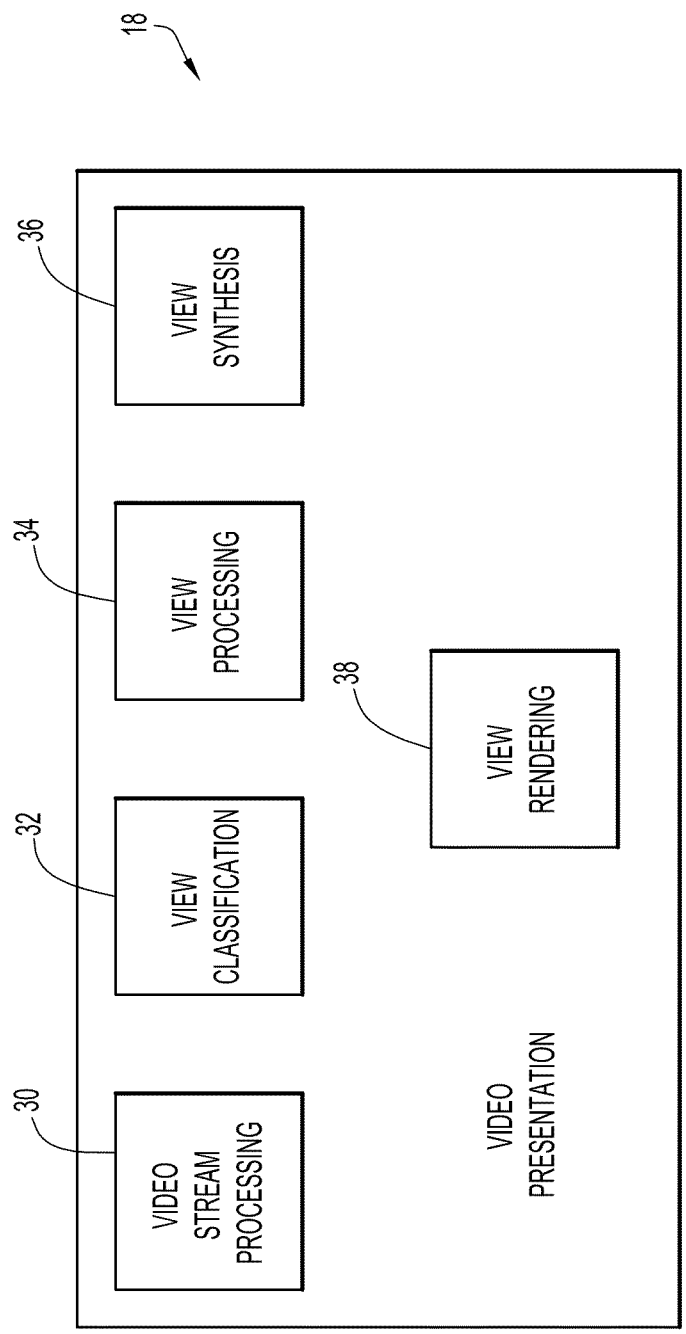
FIG. 3 is a schematic block diagram of a TP video conference module including components that support the capture and display of multiple video streams for the endpoint of FIG. 2.

Referring to FIG. 3, the video presentation module 18 includes a video stream processing module 30 including one or more software applications configured to provide (e.g., to a server 20 and/or other endpoints 6) one or more video streams comprising audio and/or video content captured by one or more cameras and microphones at the TP endpoint 6 as well as receive and process video streams comprising audio and/or video content from other endpoints 6 engaged in a TP video conferencing session with the endpoint. The video stream processing module 30 can further include any suitable codec module that encodes outgoing video streams and decodes incoming video streams in any suitable manner to enhance efficiency of video stream processing associated with the TP video conferencing session. The video presentation module 18 further includes a view classification module 32 including one or more software applications configured to classify views within the streams according to techniques described herein, a view processing module 34 including one or more software applications configured to analyze and/or filter classified views according to techniques described herein, a view synthesis module 36 including one or more software applications configured to synthesize views comprising portions (e.g., some or all) of video content from the multiple video streams associated with a TP conference session according to techniques described herein, and a view rendering module 38 including one or more software applications configured to render synthesized images for display via the plurality of display screens of the display arrangement 12 according to techniques described herein.

The network interface(s) 12 of each endpoint 6 can comprise, for example, one or more of an Ethernet interface card or switch, a modem, a router or any other suitable hardware device that facilitates a wireless and/or hardwire connection over the network 4 with one or more servers 20 and other devices, where each network interface unit can be integrated within the device or a peripheral that connects with the device.

Each host server 20 that may be associated with a TP conference session within the system 2 can also include one or more processors, memories and network interfaces that are the same or substantially similar to the processors, memories and network interfaces as described herein for the endpoints 6. In particular, the processor for each server can comprise one or more microprocessors that execute control process logic instructions stored within memories of the servers and including operational instructions that facilitate hosting of certain operations associated with TP video conference sessions and/or other types of communications between endpoints 6 within the system 2. For example, the TP environment in which video conference sessions are engaged can include collaboration platforms, where each server 20 can be configured to provide the function of handling and transferring many different forms of communication messages (e.g., email messages, audio and/or video conferencing content, instant or SMS messaging, etc.) between two or more endpoints 6 over the network 4. Each server 20 can also be provided with suitable memory capacity to store content associated with client communications for each customer device 6 (e.g., saved email messages, instant messaging or SMS communications, and/or audio/video communications, as well as other content (e.g., blogs, wikis, white boarding content and/or other types of activities, the sharing of documents, files or other content, e.g., content that is posted and available for access by users) that may be associated with a collaboration platform. In addition, each server 20 can include suitable modules including one or more software applications that facilitate the hosting of multiple simultaneous video conferencing sessions and/or other communications that may occur within a collaboration platform (e.g., the simultaneous hosting of one or more video conference sessions between different groups of endpoints, instant messaging communication sessions between other endpoints, ongoing email communications between endpoints, etc.). An example of collaboration platforms which support video conferencing as well as multiple types of communication mediums for participants include, without limitation, Cisco Quad (Cisco Systems, Inc.), WebEx Connect (Cisco Systems, Inc.), Microsoft SharePoint (Microsoft Corporation) and Lotus-Live (IBM Corporation). An example of a TP platform is Cisco Telepresence and WebEx Telepresence (Cisco Systems, Inc.). The techniques and corresponding systems described herein can be implemented within any suitable telepresence and/or collaboration platform, such as these types of platforms.

Some examples of computing devices that may be implemented for endpoints 6 and that can be used to engage and participate in a video conference session and/or other forms of communication with other endpoints in system 2 include, without limitation, stationary (e.g., desktop) computers which can act as local host servers for an endpoint (e.g., a host server that controls and interacts with various cameras, microphones, displays, speakers, etc. within a TP room). A TP endpoint may further comprises one or more of personal mobile computer devices such as thin client devices, laptops, note pads, tablets, personal data assistant (PDA) devices, and other portable media player devices, and cell phones (e.g., smartphones) including suitable input and output devices for capturing video and/or audio content from a participant engaged within a video conference session as well as receiving and displaying views from multiple video streams associated with a video conference session.

Suitable servers 20 can be any suitable types of stationary or other types of computing devices capable of hosting and managing one or more video conference sessions as well as large flows of video and other data streams associated with TP operations. In particular, each host server 20 can comprise, for example, a computing blade, a blade server comprising one or more solid state drives, or a blade center comprising one or more blade servers together with a blade chassis comprising common resources such as networking connections, input/output device connections, power connections, cooling devices, switches, etc. A host server device 20 can also be a component of a larger system, such as a Cisco Unified Computing System, or a data center that centralizes enterprise computing resources.

The endpoints and servers can utilize any suitable operating systems (e.g., Android, Windows, Mac OS, Symbian OS, RIM Blackberry OS, Linux, etc.) to facilitate interaction, activities and exchange of video and other data streams between endpoints and/or host servers as well as other devices supporting the platform for video conferencing sessions as well as other forms of communication.

Thus, the configurations of endpoints 6 and servers 20 as described herein facilitate TP video conferencing sessions between multiple endpoints, where a plurality of video streams are provided by endpoints engaged in a video conference session and the video streams are used to generate at least one synthesized and rendered view for the video conference session. The configurations can further facilitate engagement and interactive participation in a variety of different activities and types of communications between endpoints in scenarios in which servers are configured to host a collaboration platform that supports different forms of communication between endpoints.

Figure 4:
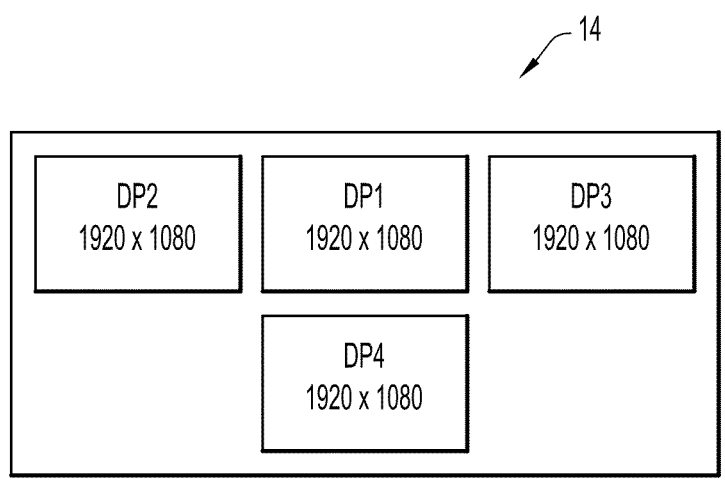
FIG. 4 depicts an example embodiment of a series of displays utilized by the endpoint of FIG. 2 to display multiple views of video streams associated with a TP video conference session within the system of FIG. 1.

Operation of the system 2 of FIGS. 1-3 is now described with reference to the flow chart of FIG. 5. During a TP video conference session between a plurality of endpoints 6 (e.g., which may be hosted by at least one server 20), a plurality of video streams video streams are provided from endpoints 6 for use by other endpoints in the conference session. The video presentation module 18 of an endpoint 6 facilitates communication and exchange of video streams as well as other data streams with other participating endpoints 6 within the ongoing video conference session. As previously noted, an endpoint 6 can include a display arrangement 14 as depicted in FIG. 4, including a plurality of display screens or panels (e.g., four display screens or panels listed as DP1, DP2, DP3 and DP4 as shown in FIG. 4). However, it is noted that the endpoint can include any suitable number of display screens in any suitable arrangements that present synthesized and rendered views comprising video content from the plurality of video streams received at the endpoint in relation to the TP conference session. Alternatively, it is noted that the display arrangement 14 may include a single display screen to present the synthesized and rendered views (i.e., within a single display screen). The display screens can include wide screens (e.g., screens with 16:9 aspect ratios) to present high definition (HD) content (e.g., displaying 1920×1080 pixel images, as indicated by the display screens for the arrangement 14 shown in FIG. 4).

At 100, an endpoint 6 receives multiple video and/or other data streams from other endpoints within the ongoing TP video conference session, where each video stream includes video and/or audio content. Video and data streams are received from one or multiple remote endpoints or intermediate nodes in the network 4 (e.g., from a TP server 20), and are acquired at the endpoint 6 for processing by the video stream processing module 30 of the video presentation module 18. The video content can include camera views of people or other images within a room at one endpoint location and/or views of data (e.g., from screen sharing of content from one or more computing devices at an endpoint). The endpoint 6 may also transmit one or more video streams that are captured by one or more cameras and/or microphones at the endpoint or comprise captured screen content of data from one or more computing devices at the endpoint. In some scenarios, video streams that originate from the endpoint 6 are forwarded to an intermediate network node (e.g., a TP server 20) and then provided in a loopback from the intermediate node to the endpoint 6 for processing. As previously noted, the video stream processing module 30 can include a codec module configured to receive and decode encoded video streams and/or other data streams transmitted by other endpoints (or as loopback streams that originated at the endpoint 6) for the TP video conference session. The codec module for the video stream processing module 30 can also encode video streams and/or other data streams that originate at the endpoint 6 for transmission to other endpoints participating in the ongoing TP video conference session.

At 110, video streams received and processed by the video stream processing module 30 are classified into views depending on identified content within the video streams. The classification of video streams is performed by the view classification module 32 of the video presentation module 18. A general classification is performed to identify whether a video stream is a people view (e.g., the view includes an image captured by a camera which may include one or more people within the image) or a data view (e.g., the view includes screen sharing images from one or more computing devices, such as an open document or other screen content). The general classification of a video stream between a people view and a data view can be performed remotely (e.g., by the originating endpoint and/or by a TP server 20 associated with the TP video conference session), such that the endpoint 6 receiving the video stream is provided view identification information along with or as part of the video stream. Alternatively, the general classification of the video stream into a people view of a data view can be performed utilizing the view classification module 32. For example, the classification can be performed by comparing images in each video stream with one or multiple templates or "signatures" of views stored by the view classification module 32 that are representative of certain types of views associated with the specific TP conference session (e.g., such templates can be generated offline or prior to engaging in the ongoing TP conference session). Alternatively, the outline of one or more persons can be generally identified within one or more frames of a video stream using the view classification module 32 to identify the video stream as including a person view. In particular, software applications are known and can be utilized to identify and track movements of humans within video images (where profiles or outlines of humans are detected within one or more video frames) so as to identify the video stream as a person view. The view classification module 32 further includes one or more suitable software applications to further classify views of video streams into more well-defined views (i.e., further classifications beyond people view or data view). For example, the view classification module 32 can include software applications that detect and identify body portions to further classify a people view as, e.g., a "head-and-shoulders" view (e.g., for a view of seated meeting participants), as a "stand-up" view (e.g., a view that contains the entire body of a person, such as a person writing on a whiteboard), etc. The software applications that provide further classifications can utilize detection methods similar to a person detection or a face detection, in which detection can be "learned", e.g., utilizing training image samples of "head-and-shoulders" views or "stand-up" views, such that the software applications can then identify such views within video frames associated with the TP conference session.

Data views can also be further classified into more specific types of data views, such as computer-generated text and/or graphics (e.g., slide presentations, documents, other types of informational content) or natural image/video views (e.g., video clips that are being shared within a data view from an endpoint). Any one or more suitable algorithms and techniques can be utilized by the software applications to specifically classify types of data views, including algorithms and techniques as described in one or more of the following references (the entire disclosures of which are incorporated herein by reference): Tian-Tsong Ng et al., "*Classifying Photographic and Photorealistic Computer Graphic Images using Natural Image Statistics*", ADVENT Technical Report #220-2006-6 Columbia University, October 2004; Tian-Tsong Ng et al., "*Physics-Motivated Features for Distinguishing Photographic Images and Computer Graphics*", ACM Multimedia, November 2005(3); and Rong Zhang et al., "*Distinguishing Photorealistic Computer Graphics from Natural Images by Imaging Features and Visual Features,*" Electronics, Communications and Control (ICECC), 2011 International Conference on, vol., no., pp. 226-229, 9-11 Sep. 2011.

After classification of a video stream, views are processed at 120 according to their specific classifications. This is achieved utilizing the view processing module 34 of the video presentation module 18. In particular, the processing of classified views includes content analysis according to classification. For example, when a people view is further classified as a "head and shoulders" view, content analysis can utilize face detection/recognition software, where face detection as well as facial features (e.g., eyes, lips, hair color/hair style, etc.) may be identified and matched with a specific person. In an example embodiment, a specific person (e.g., John Smith, who is a speaker in the conference session) might be identified in a "head and shoulders" classified view, where this specific person has been previously identified (e.g., a profile of John Smith may be stored and be accessible by the face detection/recognition software) so as to identify this person as the same person in the "head and shoulders" classified view. For a classified "stand-up" view, motion detection software can be utilized to detect and track a body skeleton within the "stand-up" view (e.g., a view of a person walking toward a podium or moving while providing a presentation at a whiteboard).

Another type of analysis can be detection and/or identification of an active person within a people view, such as a speaker (i.e., a person who is currently speaking) within the conference session. This can be achieved via analysis of audio content in addition to video content, where one or more active speakers can be defined as those speakers contributing the most audio content within a people view. For example, consider a people view further classified as a "head and shoulders" view, in which a seated panel of people is captured within the people view including the heads and shoulders of a plurality of people. Assuming each person seated at the panel has a microphone, or that only one speaker speaks through a microphone at any given time, the audio content can be analyzed in combination with the video content within the video streams so as to identify which people are the active speakers within a given "head and shoulders" view.

Classified people views can further be analyzed to determine one or more regions of interest (ROI) within any given view so as to monitor and track such ROI within views for use in the synthesizing of views as described herein. A region of interest (ROI) is a smaller sized portion of a classified view (e.g., an area defined by a smaller pixel dimension within a frame). In an example embodiment, each meeting participant for the TP conference session can be detected, identified and optionally tracked as a ROI, so as to easily synthesize and render a view including a desired participant at any given time during the conference session. The body portion detection and face detection/recognition software for further classifying people views into more descriptive views (e.g., "head and shoulders" views, "stand-up" views, etc.) can be used (e.g., in combination with view profiles stored by the video presentation module 18 or any other storage module that may be accessible by the view processing module 34) to identify any selected number (e.g., some or all) of the participants within the TP video conference session in order to easily identify and isolate one or more desired persons within any views of the video streams to assist in synthesizing views as described herein. Further, tracking detection software can be used, e.g., for "stand-up" views in scenarios in which a ROI may be changing within a view, such as when the ROI is defined around a person that is moving within a "stand-up" view (e.g., the tracking detection software may identify the ROI as including the body profile of the moving person within the view).

Content analysis of data views to further classify such data views can also be achieved utilizing the view processing module 34. As previously noted, data views typically include presentation slides, documents, and other graphical content. These forms of content can be analyzed and temporally separated into shots or groups of images. For data views that include relatively static images such as slides, documents, etc., each shot contains a sequence of frames with the same or similar content, such that each frame can be well represented by a "key frame" (e.g., for encoding and decoding purposes). An example analysis for data views includes detecting shot boundaries and extracting key frames. When video streams are encoded and transmitted over a network, loss of quality can occur at the time of encoding and/or transmission. For example, when generating coded video streams of data views, I-frames can periodically be inserted and these I-frames have lower quality due to constrained bit rates and the lack of temporal prediction. To extract high-quality key frames from a data stream, shot-boundary detection can be utilized to detect quality degradation among frames.

One or more regions of interest (ROI) may also be detected in data views utilizing the view processing module 34. For example, a data view may include a graphical page (such as a word processing document) from a shared screen of a computing device that has an aspect ratio different from an HD format that is displayed on all of the TP display screens of the display arrangement 14 (e.g., the graphical page may not be in a 16:9 aspect ratio format). Therefore, display of the data view on one or more displays of the TP conference session for an endpoint 6 will not fully occupy the view (i.e., there will be screen space or real estate that is not encompassed by this data view). In some scenarios, data view may include text or graphical content that has an aspect ratio that is not HD, but the data view may have been stretched and encoded as HD at the originating endpoint of the video stream (or an intermediate node, such as a TP server). The actual aspect ratio of the data view can either be detected at the endpoint 6 (e.g., using the view processing module 34) or aspect ratio information about the data view can be signaled by the originating endpoint or an intermediate node (e.g., a TP server), and this information can then be used to revert the content back to its actual aspect ratio (e.g., using the view processing module 34). Content analysis of the data view can also determine a ROI for the data view by detection of the actual boundary of the graphical page.

Other types of content analysis for data views can incorporate one or more speech recognition software applications (e.g., located within the view processing module 34) to enhance the ROI detection within data views based upon current activity within a conference session. For example, audio content from the video streams that is identified from one or more people currently speaking in an ongoing TP video conference session can be analyzed using the speech recognition software application(s), where the audio content is converted into text (e.g., a transcription of the audio content is generated). Text recognition can also be performed on a data view. For example, identifier terms for a data view can comprise text within the data view (e.g., text within documents, graphical content or other content of a data view). Optionally, any metadata associated with content within a data view (e.g., metadata associated with a document in the data view) can be provided within the video stream containing the data view, and this metadata can also be used in the text recognition process. A search of both the identified text from the audio content and recognized text associated with the data view can determine a best match of corresponding terms so as to identify a ROI within the data view that corresponds with the audio content. For example, a speaker within one video stream of an ongoing TP video conference session may be discussing a particular paragraph or section of a document (e.g., a word processing document, a spreadsheet document or a slide presentation) that is provided within another video stream of the conference session, and the discussed paragraph or section of the data view associated with this document can be identified by matching text from this section with corresponding identified text from the audio content associated with the people view for the speaker. The ROI can be defined as a boundary around such text from the data view that best matches the audio content.

The processing of classified views can also include spatial and temporal filtering of the views as necessary to enhance the views. By specifically tuning filter parameters according to the content of a view, the filtering can enhance quality of the ROI. For example, in a data view, when low quality frames are detected (e.g., due to rapid scrolling of a word processing document or presentation slides), filtering can be conducted to selectively drop low quality frames so as to generate a visually enhanced output that is more pleasing to the user.

At 130, the classified and processed (analyzed and/or filtered) views are further processed to generate synthesized views using the view synthesis module 36. Synthesized views can combine portions (e.g., some or all) of one people or data view with portions of another people or data view for display by a single display screen in the display arrangement 14. The synthesized views can include any combinations of one or more views for display at different display screens within the display arrangement 14. In an example embodiment, the synthesizing of views may be initiated by a user interface (via an I/O device 15) with the endpoint 6 (e.g., by a participant of the conference session). In an example scenario, a user at an endpoint 6 that is controlling displays of views at the display arrangement 14 can control and interact with applications of the view synthesis module 36 (e.g., utilizing a graphical user interface or some other suitable interactive interface with a computing device of endpoint 6) to move one data or people view from one display screen to another. Alternatively, the user may decide to merge two views or portions of two views onto one display screen. In another example embodiment, generation of synthesized views can be automatically performed by the view synthesis module 36, where the view synthesis module 36 can utilize any suitable algorithms to determine which views or portions of views are optimal at a particular point in time during the TP video conference session and then combine such views for display at the display screens of the display arrangement 14. The ROI detection for people and data views (performed by the view processing module 34) can be used to identify portions of greatest interest for generating synthesized views during the ongoing conference session.

Merging of views can include scene carving of any portion or portions of a view and then combining the carved portion(s) with another view or, alternatively, combining a complete view with some or all of another view. For example, one people view can be merged with another people view to be shown on one display screen of the display arrangement 14, where some or all of the people from each view are shown on the display screen (e.g., some people can be removed from one people view via a carving process prior to combining with another people view). In another example embodiment of a people view, such as a classified "head and shoulders" view, in which there are a number of people seated in seats and also one or more sections of the view that are empty seats, a ROI of the people view can identified that includes only seated people such that the empty seats are carved from the view to leave a remaining portion. The remaining portion can then be shown in a display screen or combined with one or more other views (or partial portions of the other views) in the display screen for viewing at the endpoint 6 during the ongoing TP video conference session. The scene carving to remove empty seats from a people view can also be performed such that empty seats in the view are removed, and the screen is split to show the best crop of one or more persons within each portion of the remaining view. In additional to scene carving, exposure compensation and dimensional sizing or "right-sizing" processes may be performed when combining people views of two persons from different video streams (or from the same video stream but seated apart from each other, where the scene carving removes a portion of the view between the two persons) in one video display of the display arrangement 14, such that the persons appear as if they were actually sitting side by side and their dimensional sizes are within the same or similar proportions or within a selected range so as to proportionally correspond with each other. For example, if a person in a first view has a proportional dimension (e.g., where a proportional dimension can be defined as a distance between any two or more portions of the person's body, such as a distance between top of forehead to top of shoulders) that differs by a threshold amount from a proportional dimension associated with another person in a second view that is to be combined with the first view, the sizing of either or both views can be modified or adjusted accordingly (i.e., increased or decreased) so as to decrease the difference between the two proportional dimensions in order to render a combined view with both persons having the same or similar proportional dimensions within the combined view.

In another example embodiment, one data view can be merged with another data view to be shown on one screen. In this scenario, instead of showing a carved segment of each view, it may be desirable to show both views completely on the same display screen, e.g., in a side-by-side manner (e.g., with smaller resolutions). To further enhance visualization of the side-by-side view from two data views, any detected and identified ROIs associated with each data view can also be implemented to show only relevant portions of each data view in order to best utilize display screen space. The ROI portions of each data view can be enlarged or magnified within the data view (e.g., as a "magnified window" overlaying the entire data view) as necessary to ensure such portions are legible or suitably visualized within the display screen. For example, in a scenario in which both data views contain word processing documents, the word processing document pages for each data view can be cropped, where the cropped portion includes the ROI portion identified for each data view, and the cropped portions can be scaled up to each occupy a selected portion of the display screen (e.g., each ROI cropped portion occupies as much as 50% of the display screen).

In still another example embodiment, a data view can be merged with a people view for display on a single display screen. For example, a data view can be shown as a picture-in-picture (PIP) arrangement within a portion of the people view. Alternatively, a synthesized "presenter" view can be generated, where a display screen space is divided into one portion that comprises a carved people view that includes an identified speaker (e.g., identification of a speaking participant can be achieved utilizing the view processing module 34 in the previously described manner) and another portion that contains a data view (e.g., with a ROI portion that has been identified as corresponding with the audio portion of the identified speaker in a manner as previously described using the view processing module 34). The data view can further be presented to provide a three dimensional effect, in which the data view is "warped" or directed inward in a direction toward the speaker within the people view displayed alongside the data view within the display screen, thus providing an immersive effect in the overall display.

At 140, all the synthesized views are rendered to one or more frame buffers for display at the display screens of the display arrangement 14 using the view rendering module 38. The rendering process can be user controlled, e.g., via a user interface (using an I/O device 15 associated with the endpoint 6), where the user decides which synthesized views are to be displayed on specific display screens of the arrangement 14. For example, a user may desire to switch two or more views between two display screens, or zoom in to see a particular image within a view. Additional processing of the views using the view rendering module 38 (e.g., scaling, light adjustment, etc.) can also be applied to the rendered images. The view rendering module 38 can also provide an automated view rendering, in which synthesized views are automatically displayed on specific display screens of the arrangement 14 based upon any suitable algorithms that prioritize which synthesized views should be displayed at any given time during the conference session.

The rendering process can also include automatic and/or manual control (control by a user) of display screen settings, such as color temperatures, white balance of screens according to the type of the view (people vs. data) to provide optimal perceptual quality. Such color control of the display screens can be useful, e.g., in scenarios such as when a user desires to switch data and people views to different display screens. Automated adjustment can be achieved by fixing color settings for display screens and applying respective gamma correction on pixels, which can be particularly effective when both people and data views are merged onto one display (e.g., in a synthesized "presenter" view as previously described).

An example embodiment for generating and rendering synthesized views based upon a plurality of video streams and utilizing an endpoint 6 within system 2 is now described with reference to FIGS. 6-9. During an ongoing TP conference session between endpoint 6 and other endpoints within system 2, a plurality of video streams 50 as shown in FIG. 6 are presented to the endpoint 6 during a time period T1 for processing. Utilizing the techniques described herein and presented in the flowchart of FIG. 5, the video streams 50 are received and processed by the video stream presentation module 30 (note that one or more of the video streams could originate from endpoint 6, sent to a TP server controlling certain features of the conference session, and then looped back to endpoint 6). The streams are classified as people and data streams using the view classification module 32, where further classification (e.g., "head and shoulders" people view, "stand-up" people view, etc.) can also be performed. After classification, video streams 52, 54, 56, 60 and 64 are classified as people views (e.g., with further classification as "head and shoulders" people views), while video stream 58 is classified as a data view (where the view in video stream 58 might be a key frame, e.g., where the view is static and does not change). The classified views are processed for content using the view processing module 34, where the views are analyzed to find ROI portions, identify any one or more speakers during the time period T1, and any correspondence between data views and people views (e.g., based upon audio content from one or more speakers during the time period T1). The analyzed content and identified ROI portions are optionally filtered as necessary to ensure a sharp and clear image is presented when the views are rendered by display screens. The endpoint 6 proceeds to generate synthesized views using the view synthesis module 36, and renders such synthesized views using the view rendering module 38 on the display screens of the arrangement 14.

Figure 6:
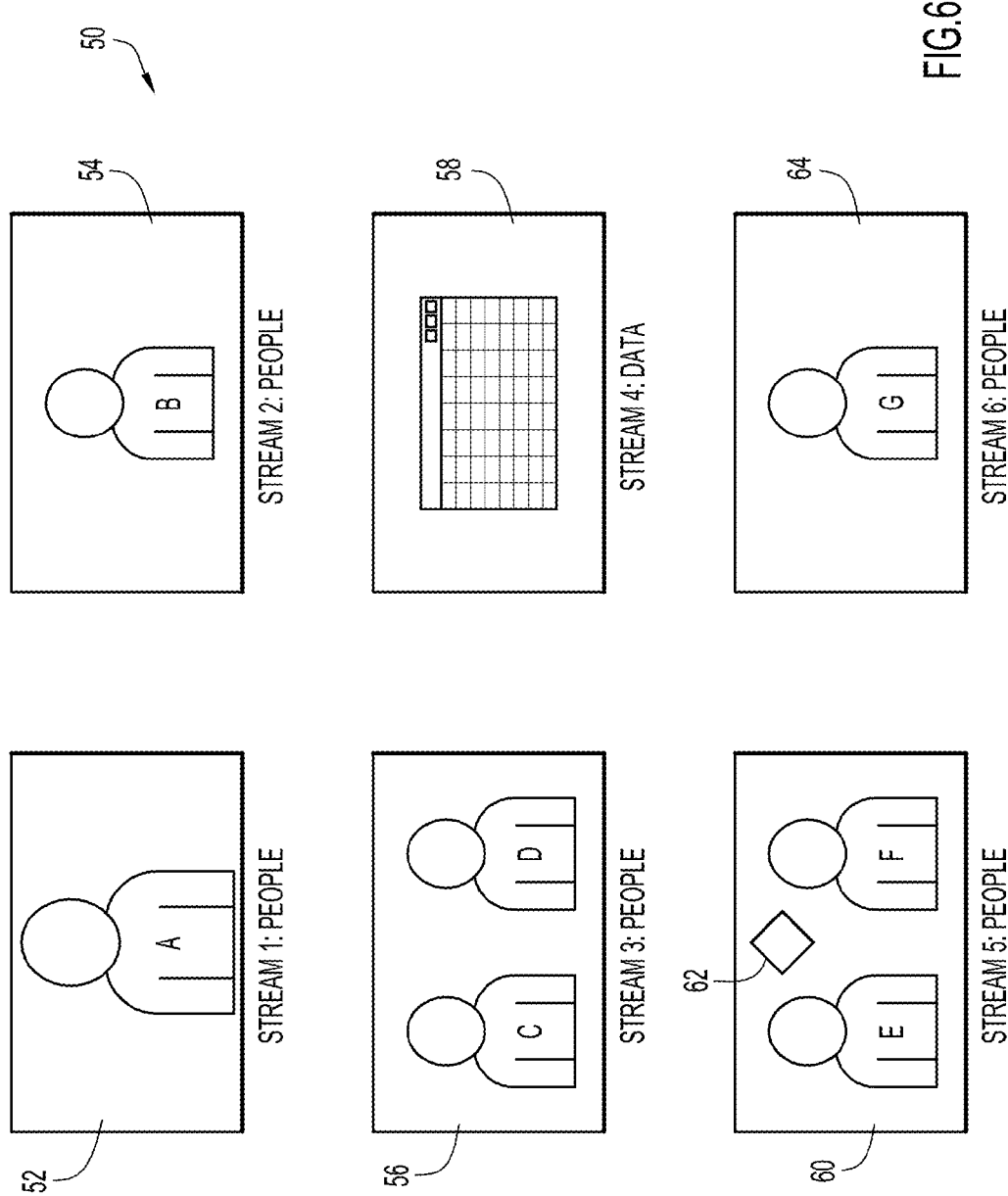
FIG. 6 depicts an example embodiment of a series of video streams transmitted by various endpoints at a time T1 within the system of FIG. 1 during a video conferencing session.
Figure 7:
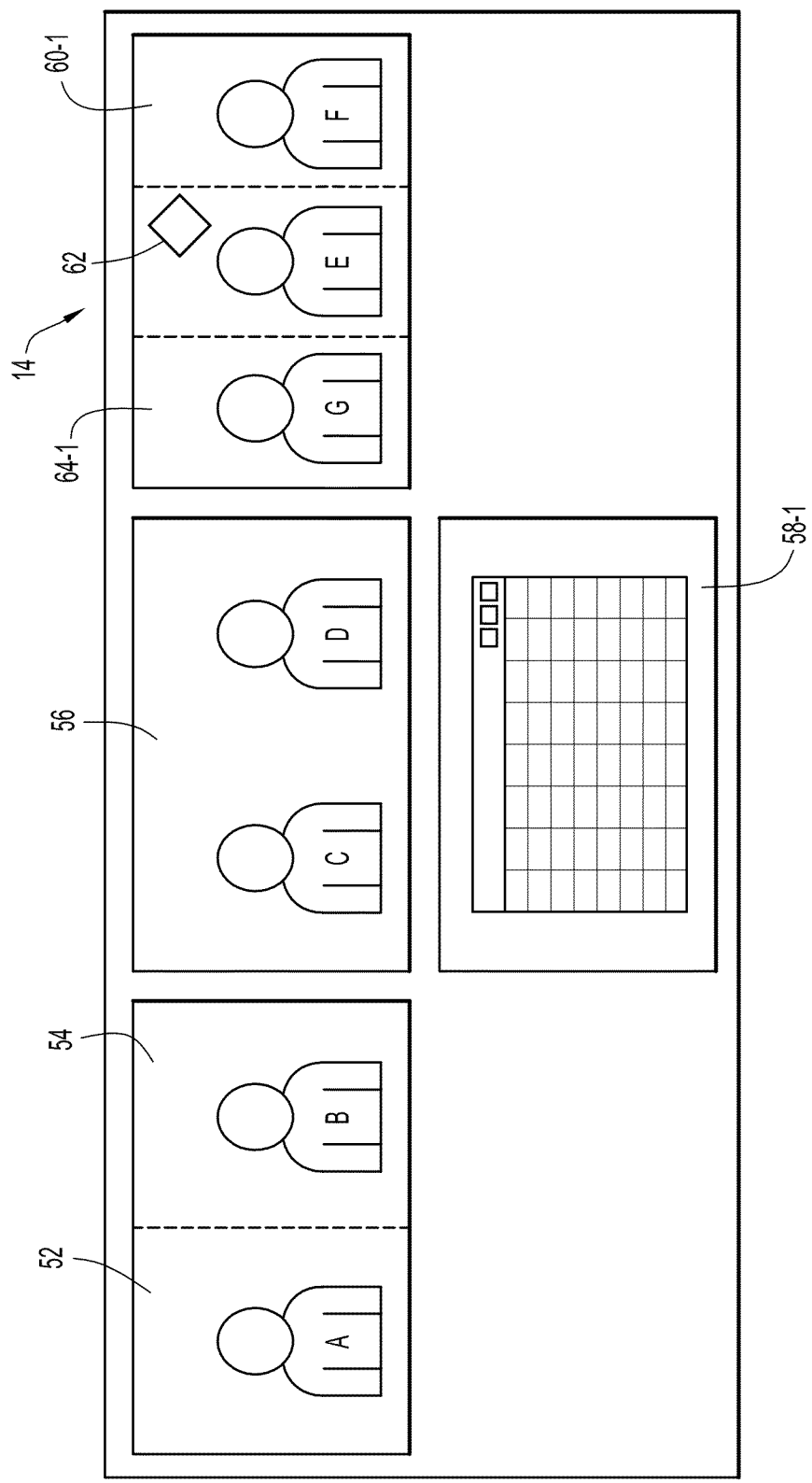
FIG. 7 depicts the series of displays as set forth in FIG. 4, in which synthesized and rendered views of the video streams depicted within FIG. 6 are displayed by the endpoint of FIG. 2 for the TP video conferencing session supported by the system of FIG. 1.

An example embodiment of synthesized and rendered views by the endpoint 6, based upon video streams 50 and at time period T1 of the ongoing video conference, is depicted in FIG. 7. In particular, portions (e.g., some or all) of the people views from video streams 52 and 54 are combined in one display screen, where each people view is dimensionally proportioned or "right-sized" to correspond with the other people view in the display screen. As can be seen in FIG. 6, person A in video stream 52 is proportioned larger within each video frame in relation to person B in video stream 54 (e.g., person A may be closer to the camera, or the camera may be focused in at some greater magnification on person A in comparison to the camera captured images for person B). An ROI portion of video stream 52 including person A can be sized smaller (e.g., dimensionally scaled down) and/or an ROI portion of video stream 54 including person B can be sized larger (e.g., dimensionally scaled up) such that a difference in proportional dimensions between person A and person B is decreased as shown in the display panel of FIG. 7, where persons A and B appear to have the same or similar proportional dimensions. Each people view is further exposure compensated such that the background lighting from each view is the same or similar. For example, if one view is from a room that is darker than the view from another room, one or each view is exposure compensated to decrease any difference in lighting or illumination between the views such that the background lighting for both views appear to be the same or deviate from each other by only a small or minimal amount (e.g., an exposure value for each view can be determined that quantifies an illumination level within a digital image, and the illumination or lighting for one or each view is adjusted such that their exposure values are the same or within a desired range of separation from each other). This makes it appear as though each person (persons A and B as shown in the display screen) are sitting together or in the same room, when they may actually be separated from each other in the same room, located in different rooms and/or at different endpoints.

In this example embodiment, one or more speakers are identified as being within video stream 56 (i.e., person C and/or person D is identified as the speaker at time period T1 within the conference session). Rendering of video stream 56 may be chosen for display at a prominent location within the arrangement 14, such as at a central location of the display screens as shown in FIG. 7. Thus, while a synthesized view of the video stream 56 has not been generated, the rendering ensures an appropriate location of this video stream within the arrangement 14 based upon a priority assignment to the video stream (e.g., since this video stream includes a speaker at the given time period T1, it should be prominently displayed, or displayed at the center of all display screens).

Another display screen includes a synthesized and rendered view that combines carved portions of each of video streams 60 and 64. In particular, carved portion 64-1 of video stream 64 includes a ROI view of a person (person G), where the view was carved to remove non-essential portions of the view (i.e., portions determined as being outside of a ROI). A carved portion 60-1 of video stream 60 includes two ROI views of persons (persons E and F) that are separated some distance within the video stream 60 but are combined after removal of portions outside of the identified ROI views (where the combining region is generally indicated by the dashed line in carved portion 60-1). A background object or feature 62 that has also been identified to be within a ROI (e.g., a company logo or some other designated object of importance) is included in the portion that includes person E. The carved portions 64-1 and 60-1 from video streams 64 and 60 are further suitably "right-sized" and exposure compensated to provide a visual effect simulating that persons E, F and G are all in the same room.

A data view 58-1 from video stream 58 is rendered on another display screen of arrangement 14. The rendering on a specific display screen of this data view 58-1 can be designated based upon its priority. For example, assuming that the speaker at time period T1 within the video conference (e.g., speaker C and/or speaker D) is speaking about content within the data view 58-1 and the endpoint 6 has identified the correspondence between the speaker and the data content (e.g., utilizing the view processing module 34, the view synthesis module 36 and the view rendering module 38), a decision can be made to prominently display the data view 58-1

(e.g., in a central location within display arrangement 14 and/or near, such as directly below, the speaker). The data view 58-1 can also be filtered, with optional cropping of an identified ROI within the data view, so as to ensure data within this view is legible and/or visually discernible within the display screen.

Figure 5:
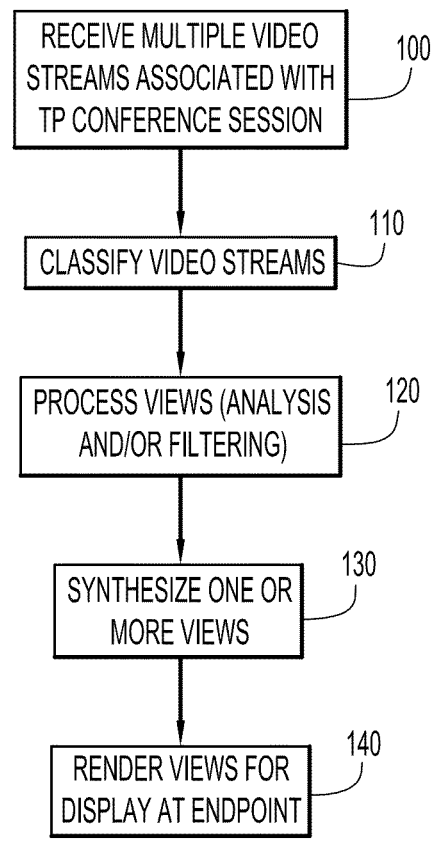
FIG. 5 is a flowchart depicting an example embodiment of a technique for synthesizing and rendering views for display in a TP video conference utilizing the system of FIG. 1.

The processing steps as set forth in FIG. 5 and as described in relation to the systems described herein can further be conducted so as to modify synthesized and rendered views of video streams for display at a given endpoint over different time periods of the ongoing TP video conference session. For example, any number of changing events may occur during the ongoing video conference session that might result in a re-prioritizing or a desire to provide different synthesized views and/or different locations for rendered views within a display arrangement at an endpoint. For example, a speaker may change during the ongoing conference session, one or more persons within a view may leave the conference session, content being discussed within data views may change during the ongoing conference session, etc. Each endpoint 6, utilizing the components of its video conference module 18, monitors the ongoing activity within the conference session and can change the synthesized and rendered views based upon changing content and activities within the incoming video streams.

Figure 8:
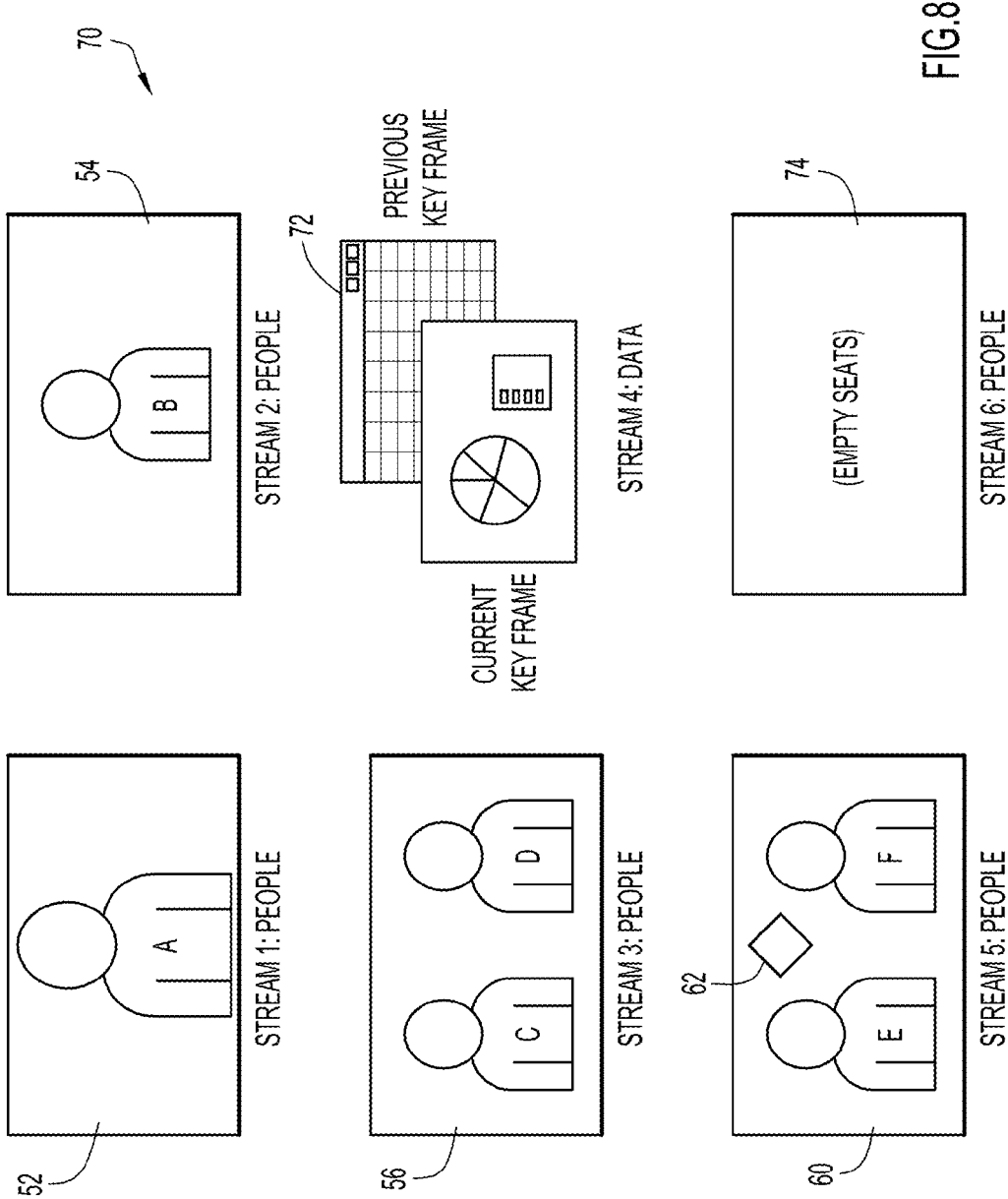
FIG. 8 depicts an example embodiment of a series of video streams transmitted by various endpoints at another time T2 within the system of FIG. 1 during a video conferencing session.

In the example scenario, content has changed at a time period T2 within the TP video conference session. In particular, as depicted in FIG. 8, a plurality of incoming video streams 70 is presented for processing by endpoint 6. In this set of video steams 70, video streams 52, 54, 56 and 60 remain the same (classified as people views, with the same persons in each view). However, the previous video stream 64, which included a people view of person G at time period T1, is now represented as video stream 74, which includes only empty seats and no persons (i.e., person G left the room). In addition, the previous video stream 58, which comprised a key frame of one data view at time period T1, is now represented as video stream 72, where the previous key frame is now overlaid by a current key frame of content (e.g., generating a graph of data from a spreadsheet program, where the graph overlays the spreadsheet data).

Figure 9:
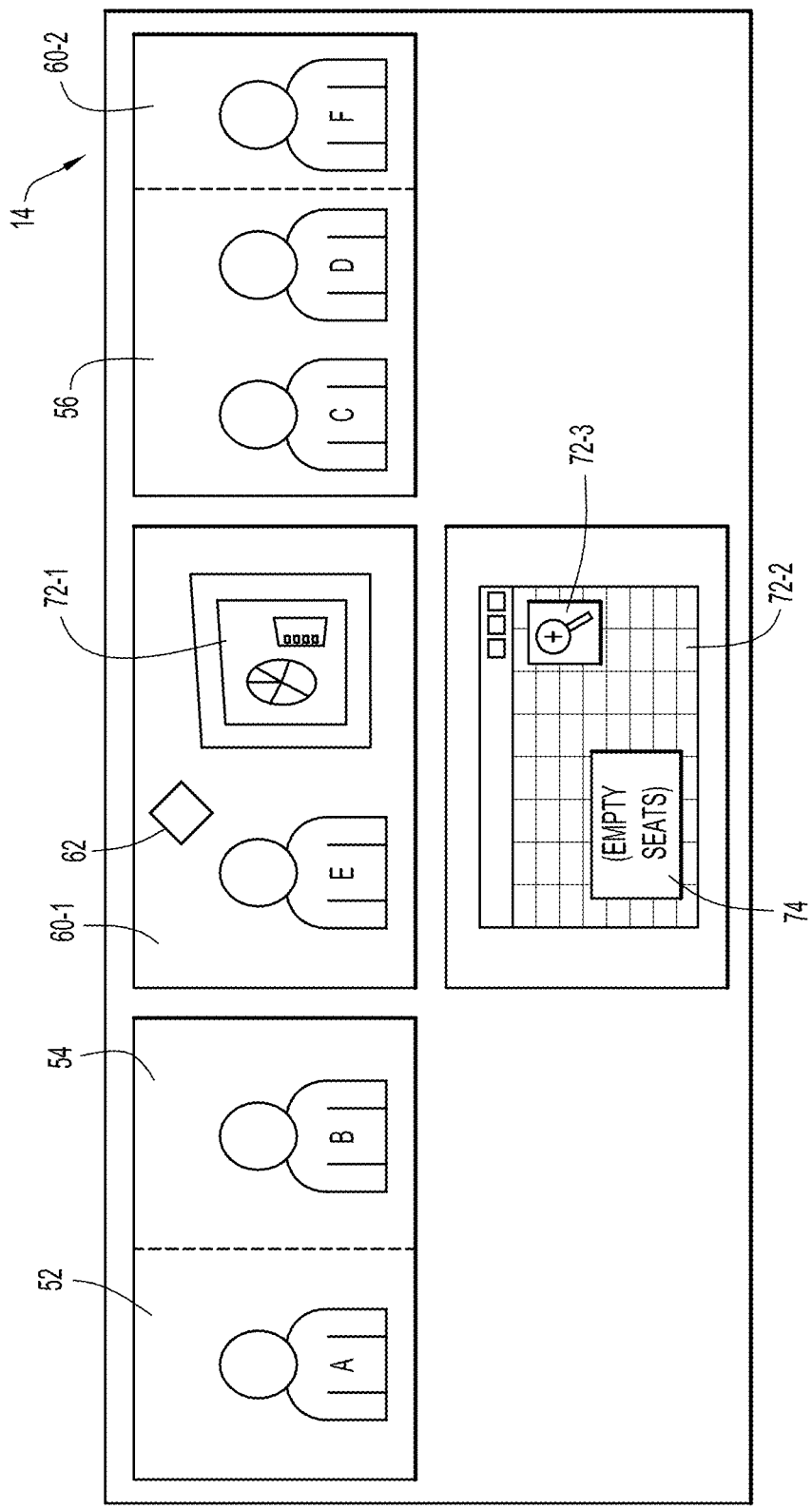
FIG. 9 depicts the series of displays as set forth in FIG. 4, in which synthesized and rendered views of the video streams depicted within FIG. 8 are displayed by the endpoint of FIG. 2 for the TP video conferencing session supported by the system of FIG. 1.

In the synthesized and rendered views at the display arrangement 14, as shown in FIG. 9, people views from video streams 52 and 54 are combined in a synthesized view for a display screen, e.g., by appropriate dimensioning or "right-sizing" of persons A and B with respect to each other, and exposure compensating as needed to provide the same or similar background lighting for both people views (thus presenting an overall image where it appears as though both persons A and B are seated together in the same room).

At time period T2 of the ongoing video conference, person E from video stream 60 is now identified as the speaker by the endpoint 6 (whereas person C and/or person D were previously identified as speakers during time period T1). In addition, the current key frame showing a chart in the data view of video stream 72 is identified as corresponding with the audio content from person E. For example, person E may be presenting on a topic citing data in the spreadsheet of the previous key frame, where person E plots the data in a chart as the current key frame overlaying the previous key frame in video stream 72. A synthesized and rendered view that combines a carved ROI portion 60-1 of video stream 60 (which includes person E) and a carved ROI portion 72-1 of video stream 72 showing the current key frame (which is a plot of data taken from the previous key frame of video stream 58 at time period T1) is displayed at a prominent location within the display arrangement 14 (e.g., at the center of all the display screens, since person E is the current speaker). The carved portion 72-1 can further be presented as a three dimensional image that is "warped" inward toward the speaker (person E), where both carved portions 60-1 and 72-1 are arranged in a side-by-side manner in the display screen. In addition, the carved portion 60-1 can also identify and include as part of the ROI a feature 62 (e.g., a company logo or other object) within the view. This allows further characterization of the speaker (e.g., person E is with the company represented by the logo shown by feature 62).

Video stream 56, which includes persons C and D, is combined in a synthesized and rendered display with a carved portion 60-2 of video stream 60. Video stream 60 includes persons E and F. However, person E, who is the current speaker, has already been included in carved portion 60-1 for another display screen. Person F can be selected in the carved portion 60-2 for combining with the other persons C and D in a single display screen to represent other participants or attendees in the conference session. The synthesized and rendered views further include appropriate dimensioning or "right-sizing" of persons C and D with person F, and exposure compensating is performed as needed to provide the same or similar background lighting for both people views (thus presenting an overall image where it appears as though persons C, D and E are all seated together in the same room).

A synthesized data view 72-2 for video stream 72 is presented for another display screen of the arrangement 14. This synthesized data view 72-2 is combined with a scaled down or dimensionally smaller people view of the empty seats from video stream 74, where the empty seats view is presented as an overlay on the data view. Since the video stream 74 includes no essential images (no identified persons or data within the view), a decision (manual or automatic) can be made to provide the empty seats view as a smaller view within another view. In addition, since the data view 72-2 of video stream 72 corresponds with the previous key frame of video stream 58, and since a more recent key frame is now associated with this video stream (i.e., data view 72-1), the data view 72-2 may be considered of lesser importance or priority in relation to other views. Thus, the decision (automatic or manual) to combine the view of video stream 74 and the data view 72-2 of the video stream 72 may be based upon a similar lower prioritization of each view in relation to other views from the video streams at time period T2. As a further feature, data from data view 72-2 may be identified as a ROI within this view, since this data is used to generate the chart in data view 72-1. Accordingly this data identified as being within a ROI of data view 72-2 can be selectively magnified as portion 72-3 in relation to other portions of the data view 72-2. For example, this can ensure that the data used to generate the chart in data view 72-1 is legible in the display screen.

Thus, the systems and corresponding techniques described herein provide for synthesizing and rendering a plurality of views at an endpoint for display on one or more display screens during an ongoing TP video conference session, where the content for the synthesized and rendered views is obtained from a plurality of incoming video streams that capture and/or provide video and/or audio content associated with the session. Each endpoint can be configured to automatically and/or manually synthesize and render its own views based upon the needs of the participants at such endpoint. Further, synthesized and rendered views can change based upon changing content and activities associated with an ongoing TP video conference session at different time periods.

While the techniques for synthesizing and rendering views for a TP video conference session have been described herein as being performed at an endpoint within the network that supports the conference session, it is noted that some or all of the process steps can also be performed at other locations (e.g., at endpoints which generate video streams, at one or more TP servers or other intermediate nodes, etc.). Further, it is noted that the various modules of the conference module for performing the various process steps can be implemented within a single computing device at an endpoint, at two or more computing devices at a single endpoint, or at different endpoints and/or other intermediate nodes (e.g., at one or more TP servers) within the network.

The above description is intended by way of example only.

What is claimed is:

1. A method comprising:
   receiving a plurality of video streams at an endpoint, where each video stream comprises frames of video content;
   classifying each video stream as a classified view, each classified view comprising a people view or a data view, wherein the people view includes an image of a person, and the data view includes content provided by a computing device;
   generating synthesized views of at least some of the video streams and based upon at least one classified view, wherein at least one synthesized view combines a smaller pixel dimension within each frame of a first classified view with a smaller pixel dimension within each frame of a second classified view; and
   rendering views including synthesized views for display at one or more displays.

2. The method of claim 1, wherein the classifying further comprises:
   classifying at least one video stream as a classified view including a people view of an image of a person currently speaking within the at least one video stream.

3. The method of claim 2, wherein generating the at least one synthesized view further comprises:
   combining at least a portion of the image of the person that is currently speaking with at least a portion of a data view.

4. The method of claim 2, wherein rendering views further comprises:
   displaying synthesized views at a plurality of displays, wherein a synthesized view including the image of the person currently speaking is displayed at a display centrally located within the plurality of displays.

5. The method of claim 1, wherein generating the at least one synthesized view further comprises:
   combining a first people view including a first person with a second people view including a second person.

6. The method of claim 5, wherein generating the at least one synthesized view further comprises performing at least one of:
   adjusting a size of at least one of the first and second people views so as to decrease a difference between proportional dimensions of the first and second persons in the at least one synthesized view; and
   exposure compensating at least one of the first people view and the second people view so as to decrease a difference in illumination associated with the first and second people views.

7. The method of claim 1, wherein generating the at least one synthesized view further comprises:
   displaying at least a portion of a first classified view as an overlay on at least a portion of a second classified view.

8. The method of claim 1, wherein the generating of synthesized views and rendering of views further comprises:
   generating a first set of synthesized views based upon a first set of video streams received at the endpoint during a first time period;
   rendering views including the first set of synthesized views at a plurality of displays during the first time period;
   generating a second set of synthesized views based upon a second set of video streams received at the endpoint during a second time period; and
   rendering views including the second set of synthesized views at the plurality of displays during the second time period, wherein at least one of the synthesized views of the second set differ from any of the synthesized views of the first set.

9. An apparatus comprising:
   a memory configured to store instructions including one or more video presentation applications; and
   a processor configured to execute and control operations of the one or more video presentation applications so as to:
     receive a plurality of video streams from at least one endpoint, where each video stream comprises frames of video content;
     classify each video stream as a classified view, each classified view comprising a people view or a data view, wherein the people view includes an image of at least one person that has been captured by a camera at the apparatus or at the at least one endpoint, and the data view includes content provided by an application executed at the apparatus or by the at least one endpoint;
     generate synthesized views of at least some of the video streams and based upon at least one classified view, wherein at least one synthesized view combines a smaller pixel dimension within each frame of a first classified view with a smaller pixel dimension within each frame of a second classified view; and
     render views including synthesized views for display at one or more displays.

10. The apparatus of claim 9, wherein the processor is further configured to execute and control operations of the one or more video presentation applications so as to:
    classify at least one video stream as a classified view including a people view of an image of a person currently speaking within the at least one video stream.

11. The apparatus of claim 10, wherein the processor is further configured to execute and control operations of the one or more video presentation applications so as to:
    generate the at least one synthesized view by combining at least a portion of the image of the person that is currently speaking with at least a portion of a data view.

12. The apparatus of claim 10, wherein the processor is further configured to execute and control operations of the one or more video presentation applications so as to:
    render views by displaying the person currently speaking at a display centrally located within a plurality of displays.

13. The apparatus of claim 9, wherein the processor is further configured to execute and control operations of the one or more video presentation applications so as to:
    generate the at least one synthesized view by combining at least a portion of a first people view including a first person with at least a portion of a second people view including a second person.

14. The apparatus of claim 13, wherein the processor is further configured to execute and control operations of the one or more video presentation applications so as to:
    generate the at least one synthesized view by performing at least one of:

adjusting a size of at least one of the first and second people views so as to decrease a difference between the proportional dimensions of the first and second persons in the at least one synthesized view; and exposure compensating at least one of the first people view and the second people view so as to decrease a difference in illumination associated with the first and second people views.

15. The apparatus of claim 9, wherein the processor is further configured to execute and control operations of the one or more video presentation applications so as to:

generate the at least one synthesized view by displaying at least a portion of a first classified view as an overlay on at least a portion of a second classified view.

16. One or more computer readable storage devices encoded with software comprising computer executable instructions and when the software is executed operable to:

receive a plurality of video streams at an endpoint, where each video stream comprises frames of video content;

classify each video stream as a classified view, each classified view comprising a people view or a data view, wherein the people view includes an image of a person and the data view includes content provided by a computing device;

generate synthesized views of at least some of the video streams and based upon at least one classified view, wherein at least one synthesized view combines a smaller pixel dimension within each frame of a first classified view with a smaller pixel dimension within each frame of a second classified view; and render views including synthesized views for display at one or more displays.

17. The one or more computer readable storage devices of claim 16, wherein the instructions are further operable to classify views by:

classifying at least one video stream as a classified view including a people view of an image of a person currently speaking within the at least one video stream.

18. The one or more computer readable storage devices of claim 17, wherein the instructions are further operable to generate the at least one synthesized view by:

combining at least a portion of the image of the person that is currently speaking with at least a portion of a data view.

19. The one or more computer readable storage devices of claim 17, wherein the instructions are further operable to render views by:

displaying synthesized views at a plurality of displays, wherein a synthesized view including the image of the person currently speaking is displayed at a display centrally located within the plurality of displays.

20. The one or more computer readable storage devices of claim 16, wherein the instructions are further operable to generate the at least one synthesized view by:

combining a first people view including a first person with a second people view including a second person.

21. The one or more computer readable storage devices of claim 20, wherein the instructions are further operable to generate the at least one synthesized view by performing at least one of:

adjusting a size of at least one of the first and second people views so as to decrease a difference between proportional dimensions of the first and second persons in the at least one synthesized view; and exposure compensating at least one of the first people view and the second people view so as to decrease a difference in illumination associated with the first and second people views.

22. The one or more computer readable storage devices of claim 16, wherein the instructions are further operable to generate the at least one synthesized view by:

displaying at least a portion of a first classified view as an overlay on at least a portion of a second classified view.

* * * * *